(12) United States Patent
Tomono

(10) Patent No.: US 11,802,779 B2
(45) Date of Patent: Oct. 31, 2023

(54) MAP GENERATION SYSTEM AND MOBILE OBJECT

(71) Applicant: Chiba institute of technology, Chiba (JP)

(72) Inventor: Masahiro Tomono, Chiba (JP)

(73) Assignee: CHIBA INSTITUTE OF TECHNOLOGY, Chiba (JP)

( * ) Notice: Subject to any disclaimer, the term of this patent is extended or adjusted under 35 U.S.C. 154(b) by 115 days.

(21) Appl. No.: 17/258,509

(22) PCT Filed: Jul. 30, 2018

(86) PCT No.: PCT/JP2018/028426
§ 371 (c)(1),
(2) Date: Jan. 7, 2021

(87) PCT Pub. No.: WO2020/026294
PCT Pub. Date: Feb. 6, 2020

(65) Prior Publication Data
US 2021/0270633 A1 Sep. 2, 2021

(51) Int. Cl.
*G01C 21/00* (2006.01)
*G01C 21/36* (2006.01)
(Continued)

(52) U.S. Cl.
CPC ....... *G01C 21/3804* (2020.08); *G01C 21/367* (2013.01); *G01C 21/387* (2020.08);
(Continued)

(58) Field of Classification Search
CPC ... G05D 1/0274; G01S 17/931; G01S 13/931; G01S 17/89; G01S 13/89; G06V 20/58; G06V 20/56; G08G 1/16
See application file for complete search history.

(56) References Cited

U.S. PATENT DOCUMENTS 9,305,241 B2 * 4/2016 Pope ..................... G01S 7/4808
9,636,265 B2 * 5/2017 Furuta ..................... A61G 5/04
(Continued)

FOREIGN PATENT DOCUMENTS

DE   102013018721 A1 * 6/2014  ............ G08G 1/143
DE   102021003563 A1 * 9/2021
(Continued)

OTHER PUBLICATIONS

English translation of Kiyoto reference, provided by J-Plat-Pat. (Year: 2006).*
(Continued)

*Primary Examiner* — Shelley Chen
(74) *Attorney, Agent, or Firm* — Pearne & Gordon, LLP

(57) ABSTRACT

Provided are a map generation system and a mobile object configured so that the map accuracy of an occupancy grid map can be ensured while a memory capacity and an arithmetic processing load can be reduced. The map generation system includes a storage (27) configured to store, as detection information, a detection value obtained for each detection unit by a detection device (4) in chronological order, a map producer (23) configured to produce the occupancy grid map based on the detection information stored in the storage (27) and cause the storage (27) to store the occupancy grid map, and an influence ratio calculator (24) configured to calculate an influence ratio for the occupancy grid map for each piece of detection information stored in the storage (27). The map producer (23) sorts the detection information based on the influence ratio calculated by the influence ratio calculator (24) to produce the occupancy grid map.

6 Claims, 10 Drawing Sheets

(51) Int. Cl.
  *G06T 17/05* (2011.01)
  *G01S 17/89* (2020.01)
  *G06V 20/58* (2022.01)
(52) U.S. Cl.
  CPC .......... *G01C 21/3885* (2020.08); *G01S 17/89* (2013.01); *G06T 17/05* (2013.01); *G06V 20/58* (2022.01); *G06T 2207/10028* (2013.01)

(56) References Cited

U.S. PATENT DOCUMENTS

| | | | |
|---|---|---|---|
| 11,221,629 B2 | 1/2022 | Watanabe et al. | |
| 2009/0238473 A1* | 9/2009 | McKitterick | G01S 13/9023 702/194 |
| 2010/0063730 A1* | 3/2010 | Case | G01C 21/005 701/414 |
| 2010/0246485 A1* | 9/2010 | Potkonjak | G01S 1/028 370/328 |
| 2011/0282581 A1* | 11/2011 | Zeng | G01S 17/89 701/301 |
| 2012/0053755 A1* | 3/2012 | Takagi | G01S 7/4808 701/1 |
| 2015/0245962 A1* | 9/2015 | Furuta | A61G 5/06 901/1 |
| 2017/0269201 A1* | 9/2017 | Adachi | G01S 13/931 |
| 2019/0302796 A1 | 10/2019 | Watanabe et al. | |

FOREIGN PATENT DOCUMENTS

| | | | | |
|---|---|---|---|---|
| JP | 2005032196 A | * | 2/2005 | ........... G05D 1/0217 |
| JP | 2006252346 A | * | 9/2006 | |
| JP | 2011-238104 A | | 11/2011 | |
| JP | 2011238104 A | * | 11/2011 | ............. G08G 1/143 |
| JP | 2017-157087 A | | 9/2017 | |
| JP | 2017-166966 A | | 9/2017 | |
| JP | 2017-191539 A | | 10/2017 | |
| JP | 2017-222309 A | | 12/2017 | |
| JP | 2018-005470 A | | 1/2018 | |
| TW | 201818175 A | | 5/2018 | |
| WO | WO-9535531 A1 | * | 12/1995 | ........... G05D 1/0274 |
| WO | WO-2009107430 A1 | * | 9/2009 | ............. G05D 1/024 |

OTHER PUBLICATIONS

English translation of Asahara reference, provided by PE2E Search. (Year: 2009).*
Office Action dated Sep. 28, 2021 for the corresponding Japanese Patent Application No. 2020-533896.
International Search Report dated Oct. 23, 2018 Issued in Patent Application No. PCT/JP2018/028426.
Tomono, Masahiro, "Data Reduction for Long-Term Mapping Using Occupancy Grid Map with Observation Frequency", Transactions of the JSME, Accepted Date May 8, 2018, Chiba Institute of Technology, Japan; English abstract.
Office Action dated Jun. 30, 2022 for the corresponding Chinese Patent Application No. 201880094559.1.

* cited by examiner

FIG. 7
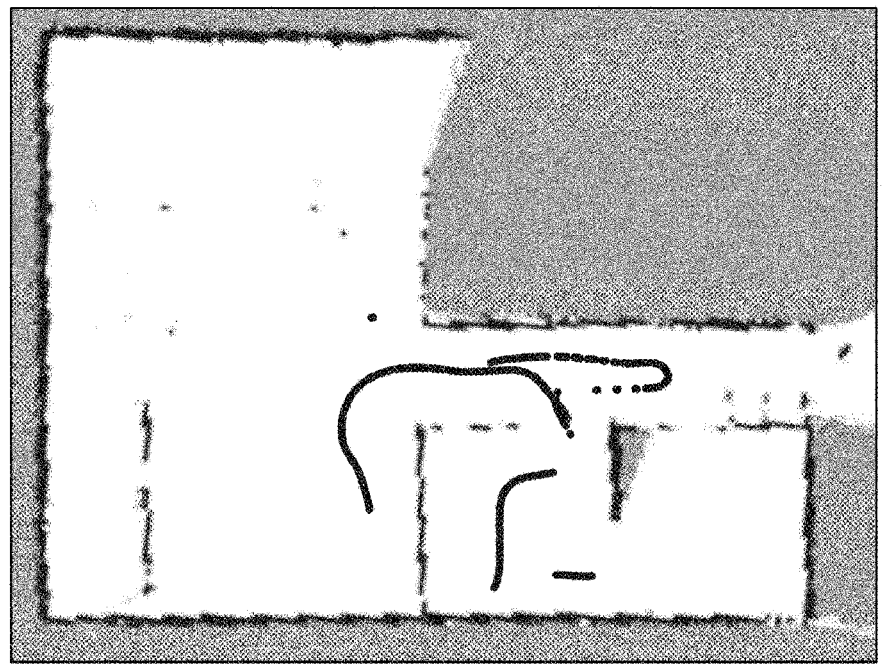
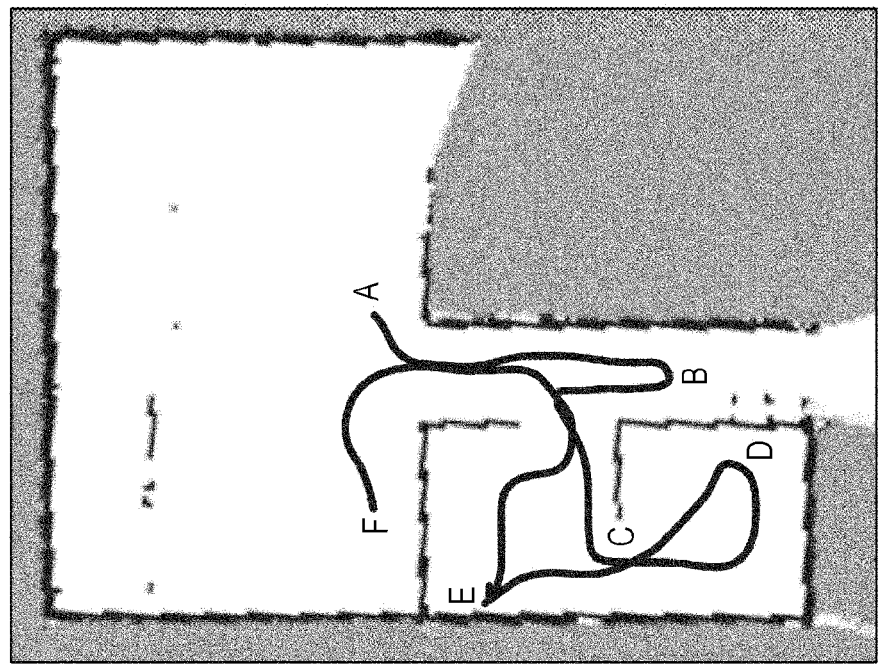

FIG. 9
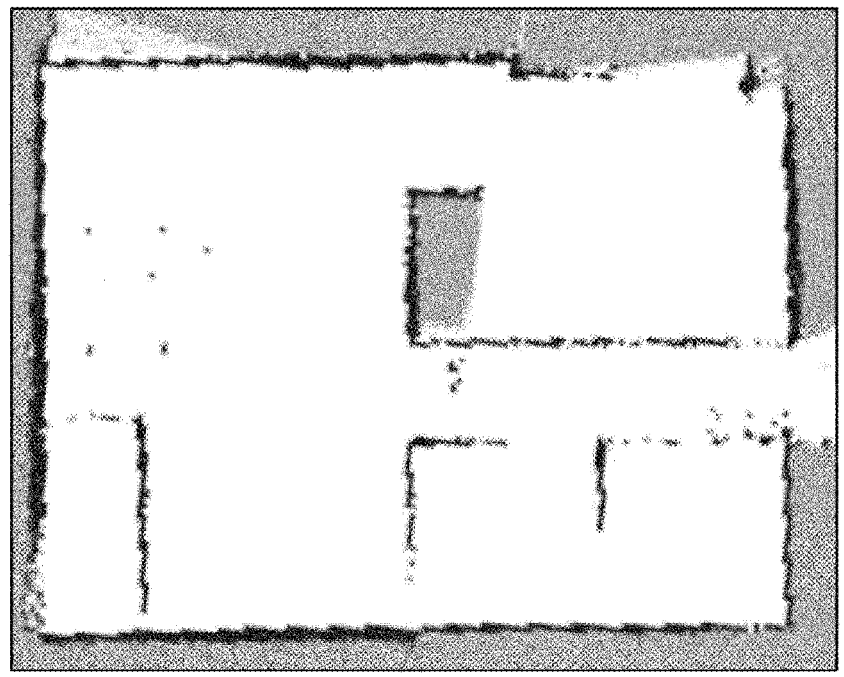
(B)
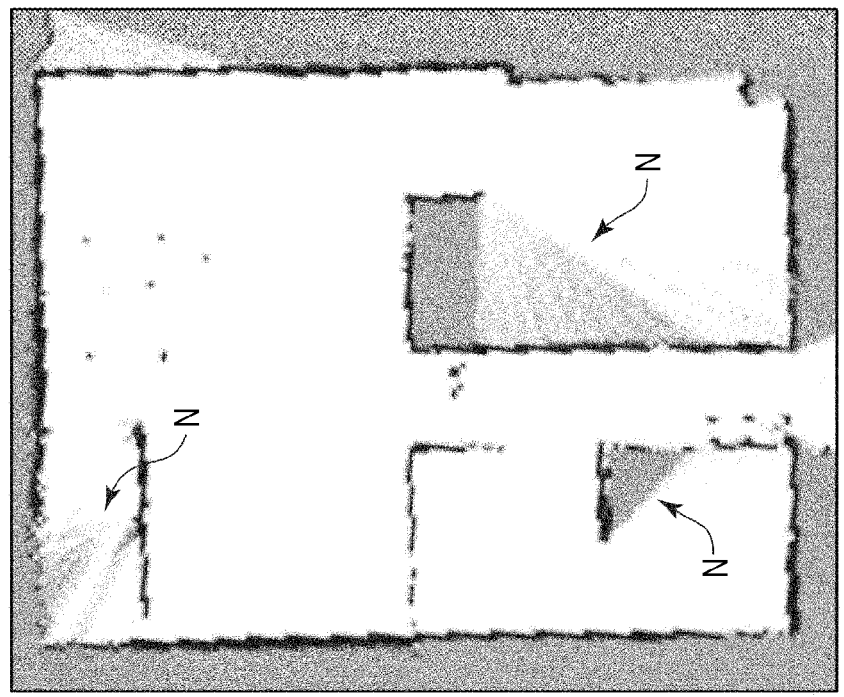
(A)

MAP GENERATION SYSTEM AND MOBILE OBJECT

TECHNICAL FIELD

The present invention relates to a map generation system and a mobile object.

BACKGROUND ART

Typically, as the technique for causing an autonomously-runnable mobile object to autonomously run, a technique called simultaneous localization and mapping (SLAM) has been used for self-location estimation and environmental map production. As an environmental map, an occupancy grid map produced based on the presence or absence of an object in a movement range of the mobile object is sometimes used (see, e.g., Patent Literature 1). The occupancy grid map is configured such that a plane or a space in the movement range is stored with the plane or the space being divided into multiple sections (cells) and a cell value corresponding to the presence or absence of the object is provided to each divided section. Moreover, in the occupancy grid map, the probability (hereinafter referred to as an existence probability or an occupancy probability) of the presence of the object is calculated for each section based on multiple scans, and the cell value of each section is managed based on such a probability.

CITATION LIST

Patent Literature

PATENT LITERATURE 1: JP-A-2017-157087

SUMMARY OF INVENTION

Problems to be Solved by Invention

Production (and updating) of the occupancy grid map is executed every predetermined time or every predetermined number of scans, and as such a scan number increases, information amount increases so that the accuracy of the map can be enhanced. However, as scan data (hereinafter sometimes referred to as detection information) increases, a memory is more consumed and an arithmetic processing load increases. In the case of calculating the existence probability and the cell value for a single section by multiple scans, information overlaps between scans executed before and behind, and the cell value is overwritten by the later scan. For this reason, the technique of sequentially deleting the scan data in chronological order to calculate the cell value by means of only new scan data is conceivable. However, in such a technique, there is a probability that old scan data including effective information is also deleted and the accuracy of the map is degraded.

An object of the present invention is to provide a map generation system and a mobile object configured so that the map accuracy of an occupancy grid map can be ensured while a memory capacity and an arithmetic processing load can be reduced.

Solution to Problems

A map generation system according to the present invention is a system for detecting a distance to a peripheral object and a direction of the object in a movement range of a mobile object by a detection device to generate an occupancy grid map based on a presence or absence of the object, the map generation system including: a storage device configured to store, as detection information, a detection value obtained for each detection unit by the detection device in chronological order; a map production device configured to produce the occupancy grid map based on the detection information stored in the storage device and cause the storage device to store the occupancy grid map; and an influence ratio calculation device configured to calculate an influence ratio for the occupancy grid map for each piece of the detection information stored in the storage device. The map production device sorts the detection information based on the influence ratio calculated by the influence ratio calculation device to produce the occupancy grid map.

According to such an aspect of the present invention, the map production device sorts the detection information based on the influence ratio calculated by the influence ratio calculation device to produce the occupancy grid map. Thus, the occupancy grid map can be efficiently produced or updated. That is, the map production device performs such sorting that the detection information with a low influence ratio for the occupancy grid map is not used. Thus, the number of pieces of detection information to be utilized for arithmetic processing can be reduced, a memory capacity can be suppressed low, and an arithmetic processing load can be reduced. Meanwhile, the detection information with a high influence ratio for the occupancy grid map is sorted and used, and therefore, effective information is left even though such information is old detection information. Consequently, the map accuracy of the produced occupancy grid map can be ensured.

In the present invention, it is preferred that an observed frequency calculation device configured to count the detection information stored in the storage device for each section of the occupancy grid map to calculate an observed frequency is further provided, and the influence ratio calculation device determines effectiveness or ineffectiveness of each section for each piece of the detection information based on the observed frequency calculated by the observed frequency calculation device, and calculates the influence ratio such that the influence ratio increases according to a percentage of the effective section.

According to such a configuration, the observed frequency calculation device counts the detection information stored in the storage device for each section of the occupancy grid map to calculate the observed frequency, and based on the observed frequency, increases the influence ratio of the detection information according to the percentage of the effective cell. Thus, the detection information can be efficiently sorted. That is, in a case where multiple pieces of detection information (detection values) including old information and new information are present for a certain section, the number of these pieces (the number of times of detection) is recorded as the observed frequency, and a predetermined number of pieces of information are taken as effective in reverse chronological order and information older than these pieces are taken as ineffective. Moreover, the influence ratio of the detection information with many effective sections is evaluated high. With this configuration, the influence ratio of the new detection information easily reflecting an environmental change becomes higher for the section with a higher observed frequency (a greater number of times of detection), and the map accuracy of the occupancy grid map can be enhanced. For the section with a lower observed frequency (a smaller number of times of detection), even the influence ratio of the relatively-old detection information is evaluated high, and the occupancy grid map can be produced with even the old detection information with effective information being properly left.

It is preferred that, in the present invention, the map production device updates a section value of a section of which observed frequency calculated by the observed frequency calculation device is less than a predetermined threshold to produce the occupancy grid map.

According to such a configuration, the map production device updates the section value of the section of which observed frequency is less than the predetermined threshold to produce the occupancy grid map. Thus, the relatively-new detection information is sorted, and the occupancy grid map reflecting the environmental change can be produced.

It is preferred that, in the present invention, the map production device updates, regardless of the observed frequency calculated by the observed frequency calculation device, a section value of each section to produce the occupancy grid map.

According to such a configuration, the map production device updates, regardless of the observed frequency, the section value of each section to produce the occupancy grid map, and therefore, the stability of the occupancy grid map can be improved.

It is preferred that, in the present invention, the map production device deletes, from the storage device, the detection information of which influence ratio calculated by the influence ratio calculation device is less than a predetermined threshold.

According to such a configuration, the map production device deletes, from the storage device, the detection information of which influence ratio is less than the predetermined threshold. Thus, an arithmetic processing load and time necessary for production of the occupancy grid map can be reduced, and the capacity of the storage device can be saved.

It is preferred that, in the present invention, the map production device uses, before deletion of the detection information from the storage device, all pieces of the detection information stored in the storage device to produce the occupancy grid map.

According to such a configuration, the map production device uses, before the detection information is deleted from the storage device, all pieces of detection information stored in the storage device to produce the occupancy grid map. Thus, the stability of the occupancy grid map can be improved.

It is preferred that, in the present invention, a coverage calculation device configured to calculate, as a coverage, a ratio between a total of influence ratios of the all pieces of the detection information stored in the storage device and a total of influence ratios of detection information belonging to a group of a predetermined number of pieces of detection information is further provided, and the map production device sets the influence ratio threshold based on the coverage calculated by the coverage calculation device.

According to such a configuration, the map production device sets the threshold of the influence ratio based on the coverage calculated by the coverage calculation device, and therefore, the detection information can be efficiently sorted for production of the occupancy grid map. Moreover, the threshold of the influence ratio is automatically set based on the coverage so that the efficiency of the arithmetic processing can be enhanced.

A mobile object according to the present invention includes: a movement device; a detection device; and a control device. The control device forms the map generation system according to any one of claims 1 to 7.

According to such an aspect of the present invention, the mobile object includes the movement device, the detection device, and the control device, and the control device forms the map generation system. As in description above, the occupancy grid map can be efficiently produced or updated, and in the autonomously-running mobile object, the map accuracy of the occupancy grid map can be ensured while the memory capacity and the arithmetic processing load can be reduced.

BRIEF DESCRIPTION OF DRAWINGS

FIG. 7 illustrates diagrams of an example of production of the occupancy grid map.

FIG. 9 illustrates diagrams of the quality of the occupancy grid map in the production example.

DESCRIPTION OF EMBODIMENTS

Hereinafter, one embodiment of the present invention will be described based on FIGS. 1 to 9.

Figure 1:
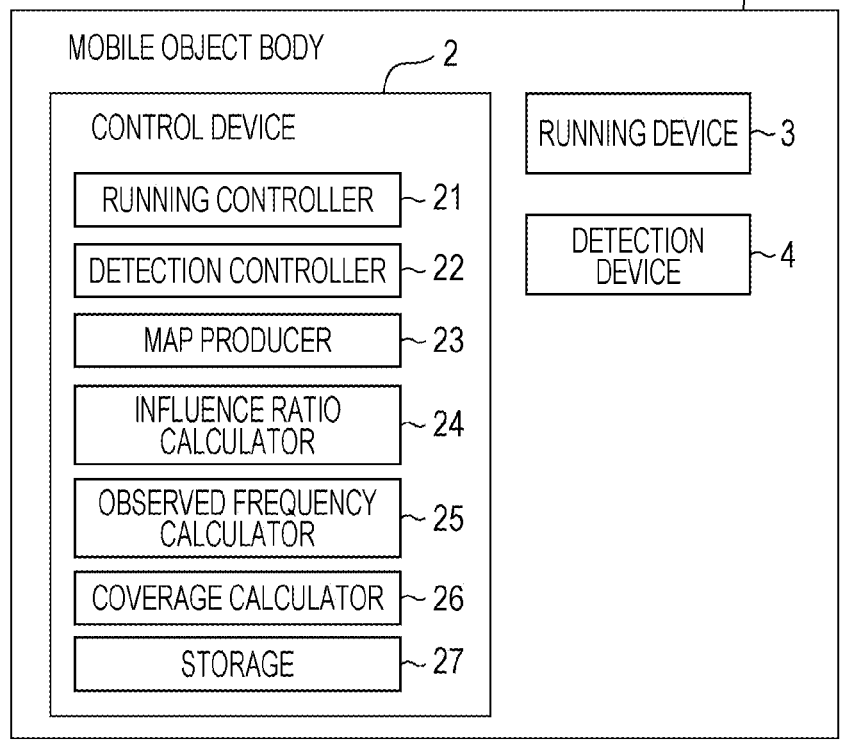
FIG. 1 illustrates a block diagram of a mobile object according to one embodiment of the present invention.

A mobile object of the present embodiment includes, as illustrated in FIG. 1, a mobile object body 1, a control device 2 configured to drivably control the mobile object body 1, a running device 3 as a movement device configured to move the mobile object body 1, and a detection device 4 configured to detect an object at the periphery of the mobile object body 1. This mobile object performs self-location estimation and environmental map production by a SLAM technique such that the running device 3 causes the mobile object body 1 to autonomously run based on a map and a running schedule stored for each target space (each movement range) in the control device 2. A later-described occupancy grid map is utilized as the map.

The mobile object body 1 includes a not-shown body and a not-shown chassis, and the running device 3 includes, for example, a pair of right and left wheels and a motor configured to independently rotatably drive the pair of wheels.

The detection device 4 includes, for example, a front sensor provided at a front portion of the mobile object body 1, an ambient sensor provided at an upper portion of the mobile object body 1, and a rear sensor provided at a rear portion of the mobile object body 1. The ambient sensor is a laser scanner (light detection and ranging or laser imaging detection and ranging (LIDAR)) configured to circumferentially emit laser light such as infrared laser to measure a distance to the object. The ambient sensor takes, as a reference location $(x, y, \theta)^T$, sensor center and orientation as a self-location acquired by the SLAM technique to detect the presence or absence and location of the object based on a distance from the sensor center and an angle (the direction) about the sensor center. In such object detection (hereinafter sometimes merely referred to as a scan), based on a laser beam emitted with a predetermined resolution (e.g., 1°) in detection for a single cycle (e.g., a single rotation, 360°) of the ambient sensor, a detection value for the single cycle is taken as a single unit (a single scan), and a detection value for the single scan is, as detection information, stored in chronological order in a storage 28.

The control device 2 includes an arithmetic device such as a CPU and a storage device such as a ROM and a RAM, and controls operation of the mobile object body 1. The control device 2 includes a running controller 21 configured to control the running device 3 and a detection controller 22 configured to control the detection device 4. Further, the control device 2 includes a map producer (map production device) 23 relating to production of the later-described occupancy grid map, an influence ratio calculator (influence ratio calculation device) 24, an observed frequency calculator (observed frequency calculation device) 25, a coverage calculator (coverage calculation device) 26, and a storage (storage device) 27 configured to store the produced occupancy grid map and various types of data.

The timing of producing the occupancy grid map by the map producer 23 is, for example, the case of a map generation mode for newly generating the occupancy grid map for a new target space, the case of a map updating mode for updating the map for the known target space for which the occupancy grid map has been already generated, and the case of an autonomous running mode for performing a normal process for the known target space. Moreover, a period (an updating span) for updating the map in the map updating mode may be based on cumulative running time (e.g., every several hours to several tens of hours) after the mobile object body 1 has run in the target space, the cumulative number of times of scan (e.g., every several thousands to several tens of thousands) after the detection device 4 has executed detection in the target space, a period set and input by a user, or a user's manual command.

Figure 2:
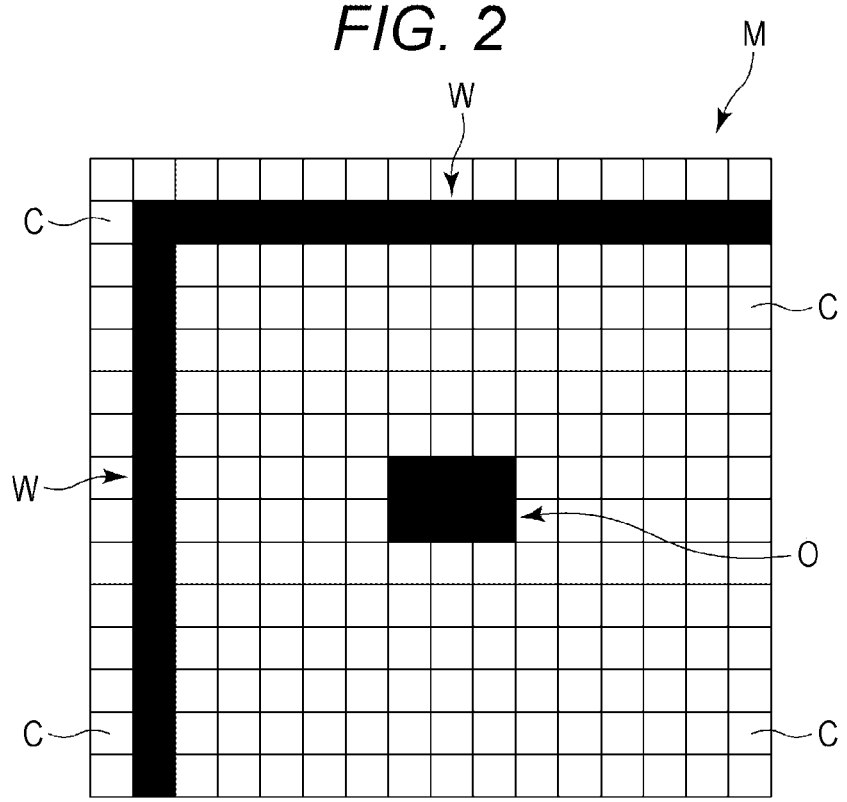
FIG. 2 illustrates a conceptual diagram of a true value of an occupancy grid map indicating a movement range of the mobile object.
Figure 3:
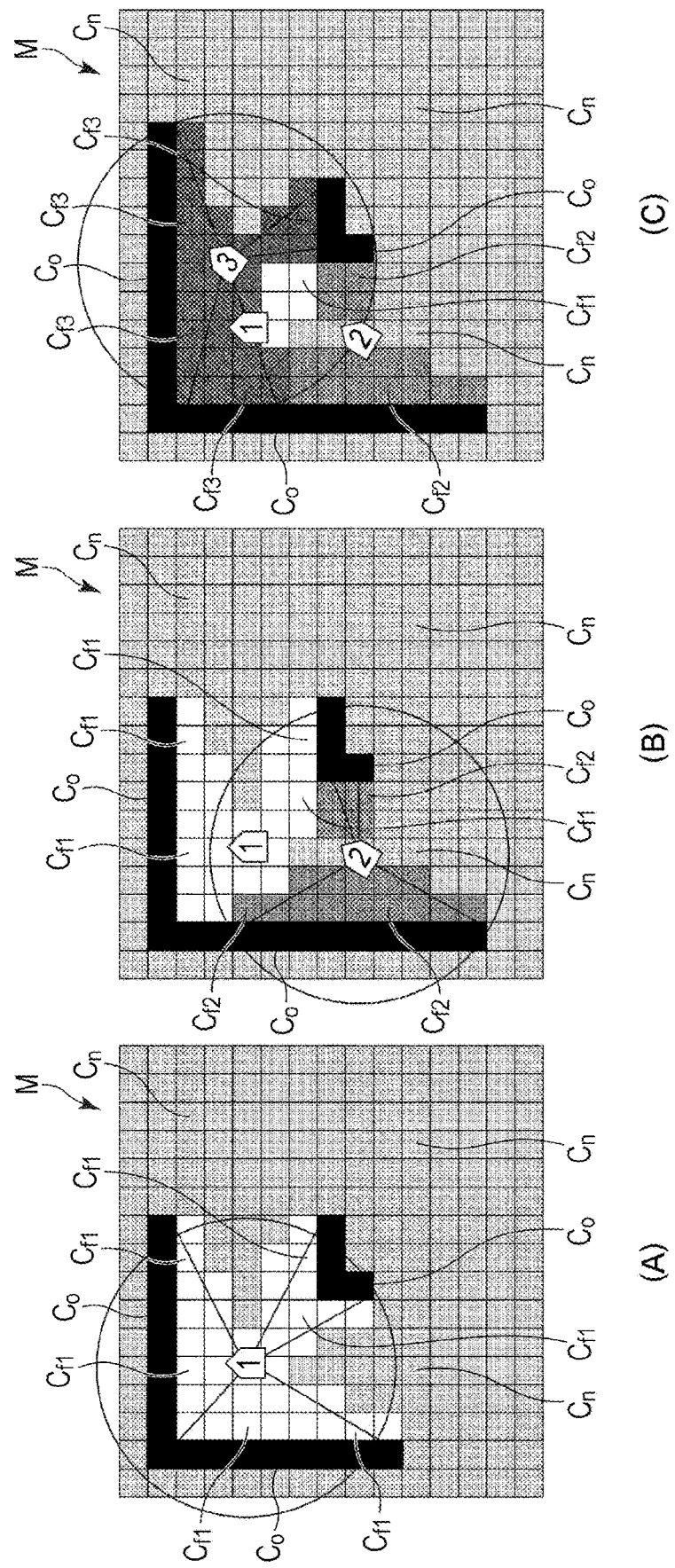
FIG. 3 illustrates conceptual diagrams of the course of production of the occupancy grid map.

Next, a basic concept regarding production of the occupancy grid map will be described with reference to FIGS. 2 and 3. FIG. 2 illustrates a conceptual diagram of a true value of an occupancy grid map M indicating the movement range of the mobile object, and FIG. 3 illustrates conceptual diagrams indicating the course of production of the occupancy grid map M. The occupancy grid map M defines the target space on a two-dimensional plane. Such a plane is divided into grids of a predetermined size (e.g., 5 cm square), and a cell value (a section value) is set for each cell C as a divided section. For example, ray casting is standard as the method for producing the occupancy grid map M, and the procedure of production of the occupancy grid map M by the ray casting will be described below.

In the ray casting, a line representing the laser beam is extended from the sensor center, and the value of the cell C through which the beam has passed is updated. As illustrated in FIG. 3, when a laser scanner (ambient sensor) measurement range is within a circle, a cell C at a location at which the beam contacts the object is occupied (e.g., the cell value=1), and a cell C through which the beam has passed is free (e.g., the cell value=−1). In a case where no object is present within the measurement range, no beam returns. Thus, such a case is taken as no observation, and the cell value is not changed in a normal case. The cell value of the occupancy grid map M is managed with logarithmic odds, and cell values obtained by multiple scans are combined to calculate the logarithmic odds. For example, when a certain cell C is taken as occupied three times and is taken as free twice, the logarithmic odds are 3+(−2)=1. An occupancy probability is calculated from such logarithmic odds. Note that in FIG. 3, the cell value is merely overwritten for the sake of simplicity in illustration.

Next, a concept in the method for producing the occupancy grid map M in the present invention will be described with reference to FIGS. 2 and 3. FIG. 2 illustrates the true value of the occupancy grid map M, assuming that walls W and an object O are present in actual environment. FIG. 3(A) illustrates the cell value of the occupancy grid map M when the control device 2 acquires a first scan (a scan of 360°) by the detection device 4. In this figure, a free cell $C_{f1}$ in the first scan is indicated as w % bite. Similarly, FIGS. 3(B) and 3(C) illustrate the cell values in a second scan and a third scan, and free cells $C_{f2}$, $C_{f3}$ in these scans are each indicated as medium gray and dark gray. In FIG. 3, any of occupied cells $C_o$ is indicated as black, and an unobserved cell $C_n$ is indicated as light gray. In each scan, multiple laser beams (e.g., a single beam for 10, i.e., the total of 360 beams) are emitted, and the cell value is set for the cell through which each laser beam has passed.

Referring to FIG. 3, most of the cell values written in the first scan are overwritten in the subsequent scan. The occupied cells $C_o$ in the first scan are included in the circles in the second and third scans, and therefore, are all overwritten. It is shown that only few free cells $C_{f1}$ in the first scan are left and the first scan does not contribute to generation of the occupancy grid map M much. In this example, the cell value is merely overwritten, but it has been found that even in a case where the occupancy probability is calculated from many scans, a similar phenomenon occurs over multiple scans.

In the method for producing the occupancy grid map M in the present invention, an influence ratio of each scan is calculated from the number of cells contributing to generation of the occupancy grid map M, and the scans with a lower influence ratio are cut. As seen from FIGS. 2 and 3, the influence ratio of the scan changes over time, and generally decreases as the scan gets old. Note that even when the scan is old in terms of time, if a new scan is not acquired in such a region, such an old scan is left. As described above, the production method of the present invention has such properties that a relatively-new scan is left, and therefore, is a technique easily reducing scan data while easily updating the occupancy grid map M.

Moreover, generally in production of the occupancy grid map M, each cell C has the logarithmic odds for calculation of the occupancy probability. However, only with the logarithmic odds, there is no information on the number of times of scan for such a cell C. For example, for obtaining logarithmic odds of −3 for a certain cell C, the beam may pass through the cell C three times to add the free value (−1) three times, or may pass through the cell C six times and reach the cell C three times to add the free value (−1) six times and the occupied value (1) three times. Only with the logarithmic odds, the number of times of passage of the beam (the number of times of scan) cannot be distinguished.

For obtaining a stable result even with noise or an error upon production of the occupancy grid map M, multiple scans preferably cause many beams to pass through each cell C to perform statistical processing. However, more scans are not always better, and in many cases, an old scan is overwritten by a new scan and is no longer necessary. For example, when the location of the object changes, a cell C as a movement source is brought into a free state, and a cell C as a movement destination is brought into an occupied state. When the location is fixed after movement, the old scan is no longer necessary. From these points, as long as the number of times of scan is explicitly managed and the cell value is calculated by a proper number of scans, unnecessary calculation is reduced.

In the method for producing the occupancy grid map M in the present invention, an observed frequency is adopted for calculating the cell value by a proper number of scans. The method is characterized in that each cell C has the observed frequency, the number of times of scan having been performed for such a cell C is recorded as the observed frequency, only N latest scans are left based on the recorded observed frequency, and old scans are discarded. N as described herein may be the number of observations sufficient for calculating the occupancy probability from the logarithmic odds, and may be a scan for 1 to 2 seconds on an empirical basis. For example, it has been found that when a frame rate of the ambient sensor is 10 fps, the sufficiently-practicable occupancy grid map M can be produced with N of 10 to 20.

The occupancy grid map M needs to be updated as needed to reflect an environmental change, and various forms of an update frequency, such as the case of performing update based on actual time and the case of regularly performing update every day, are conceivable. Moreover, for decreasing map shape distortion and holding consistency, loop closure needs to be performed. A loop as described herein is an orbiting route in which the mobile object passes through the same location, and the processing of detecting the loop to eliminate map distortion is called the loop closure. The mobile object passes through the same location many times, and for this reason, the loop closure frequently occurs. The map is recreated when the loop closure occurs, and for such recreation, all pieces of previous data are generally used. For this reason, problems due to continuous updating of the map for a long period of time include an increase in processing time and memory usage.

In the method for producing the occupancy grid map M in the present invention, a pose graph as internal data used for the loop closure is contracted according to reduction in the scan data as described above. By contraction of the pose graph, the processing time and the memory usage necessary for the loop closure and subsequent map recreation are reduced.

Specifically, a loop of a running trajectory of the mobile object is detected, and the loop closure is performed by pose adjustment. The pose adjustment is a technique performed using a pose graph indicating a constraint relationship of the location of the mobile object, and the pose graph includes nodes indicating the location of the mobile object and arcs indicating a relative location between the nodes and can indicate a deviation between an estimated location of the mobile object and a measurement value. In the pose adjustment, such a deviation is minimized, and therefore, map distortion is corrected. The processing time for the pose adjustment is substantially proportional to the number of nodes of the pose graph, and also depends on the number of loops. In the SLAM technique, the location of the mobile object is estimated in every scan, and therefore, the location of the mobile object and the number of nodes are proportional to the number of scans. Moreover, it is considered that the mobile object passes through the same location many times in small-scale environment, and therefore, it is assumed that the number of loops increases as the running trajectory becomes longer. Thus, the processing time for the pose adjustment increases as the number of scans increases, and therefore, the number of scans to be used is reduced as described above so that the size of the pose graph accompanied by the loop closure processing can be decreased, the processing time for the pose adjustment can be shortened, and the memory usage can be also reduced.

Figure 4:
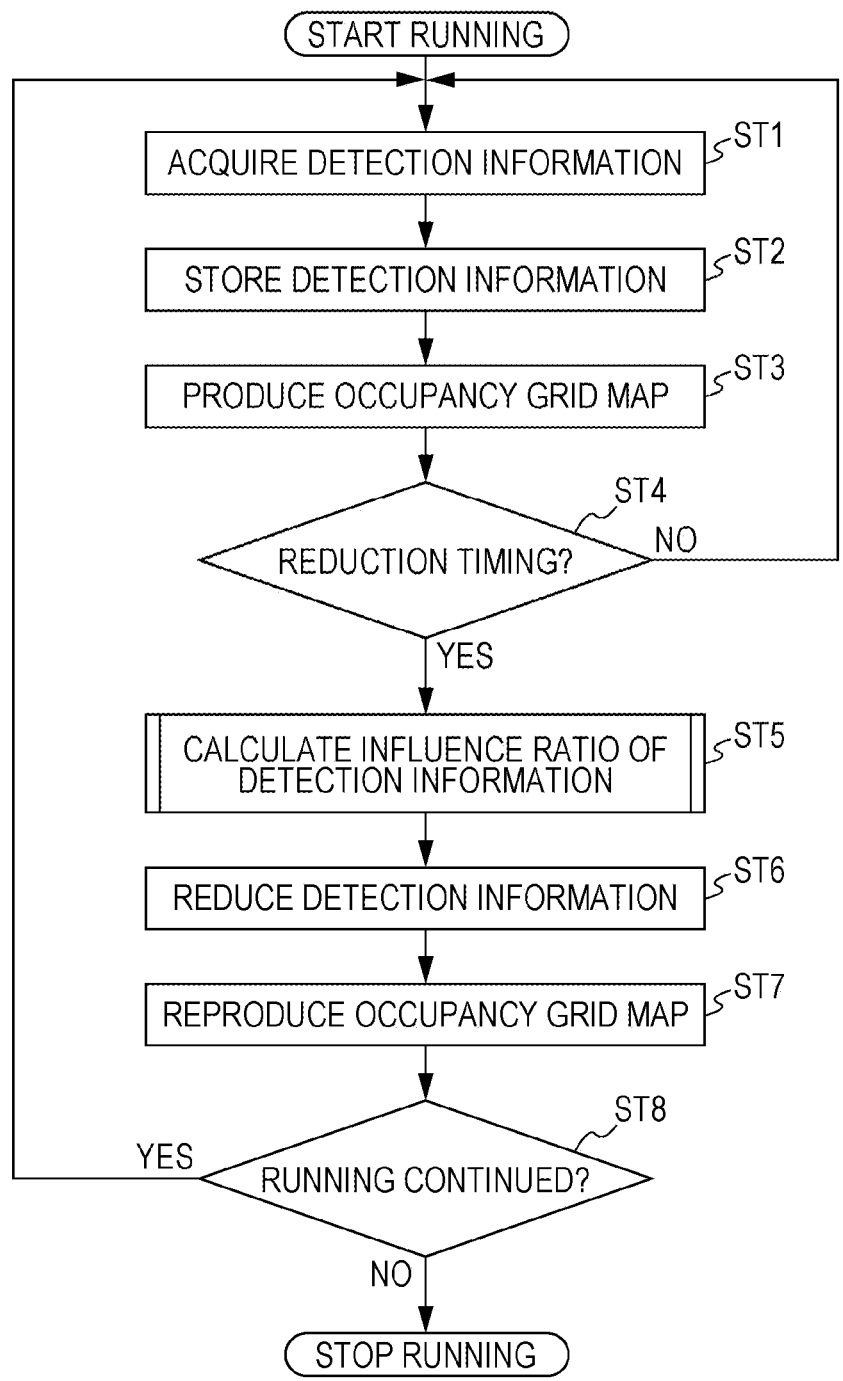
FIG. 4 illustrates a flowchart of operation of the mobile object.
Figure 5:
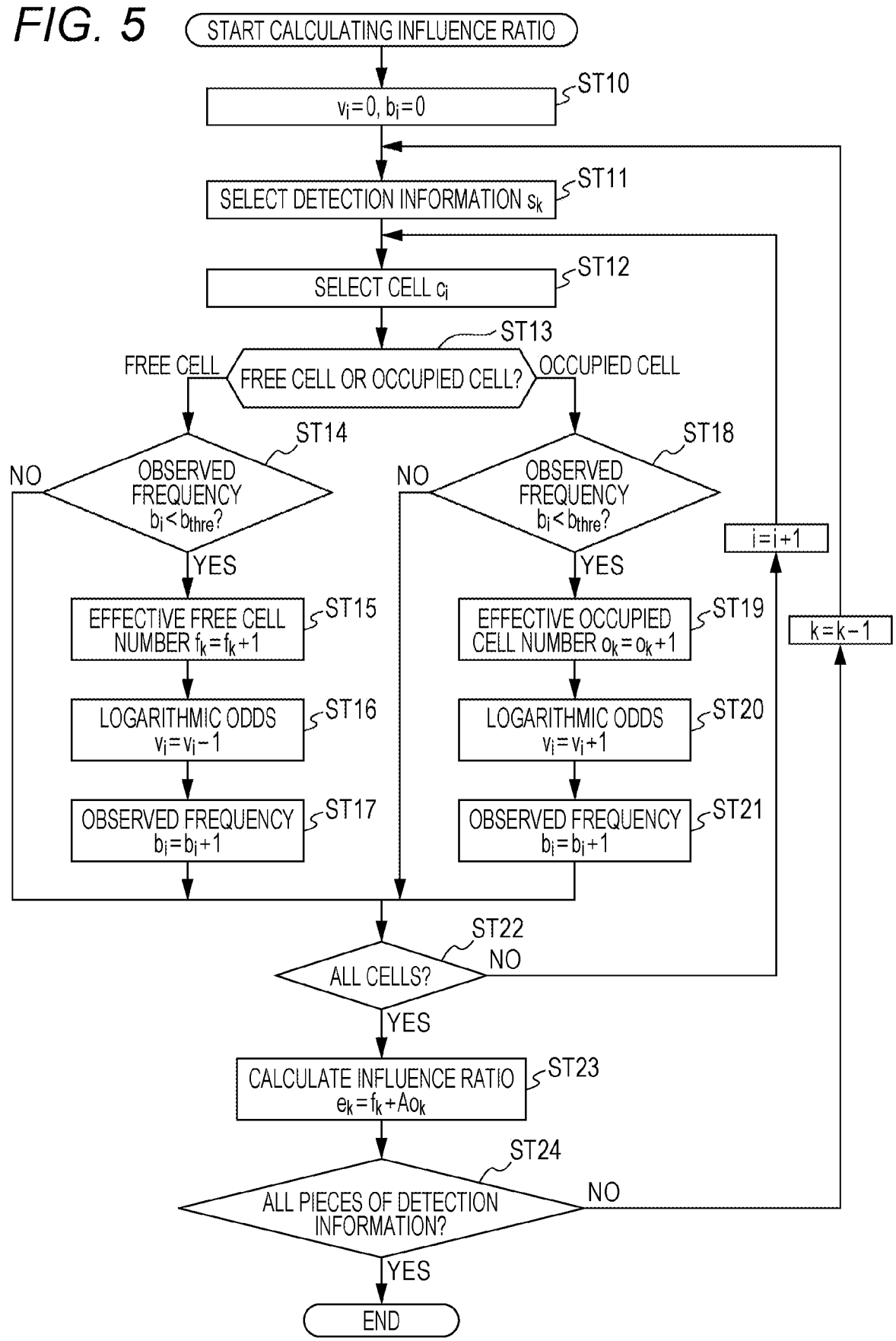
FIG. 5 illustrates a flowchart of the method for producing the occupancy grid map.
Figure 6:
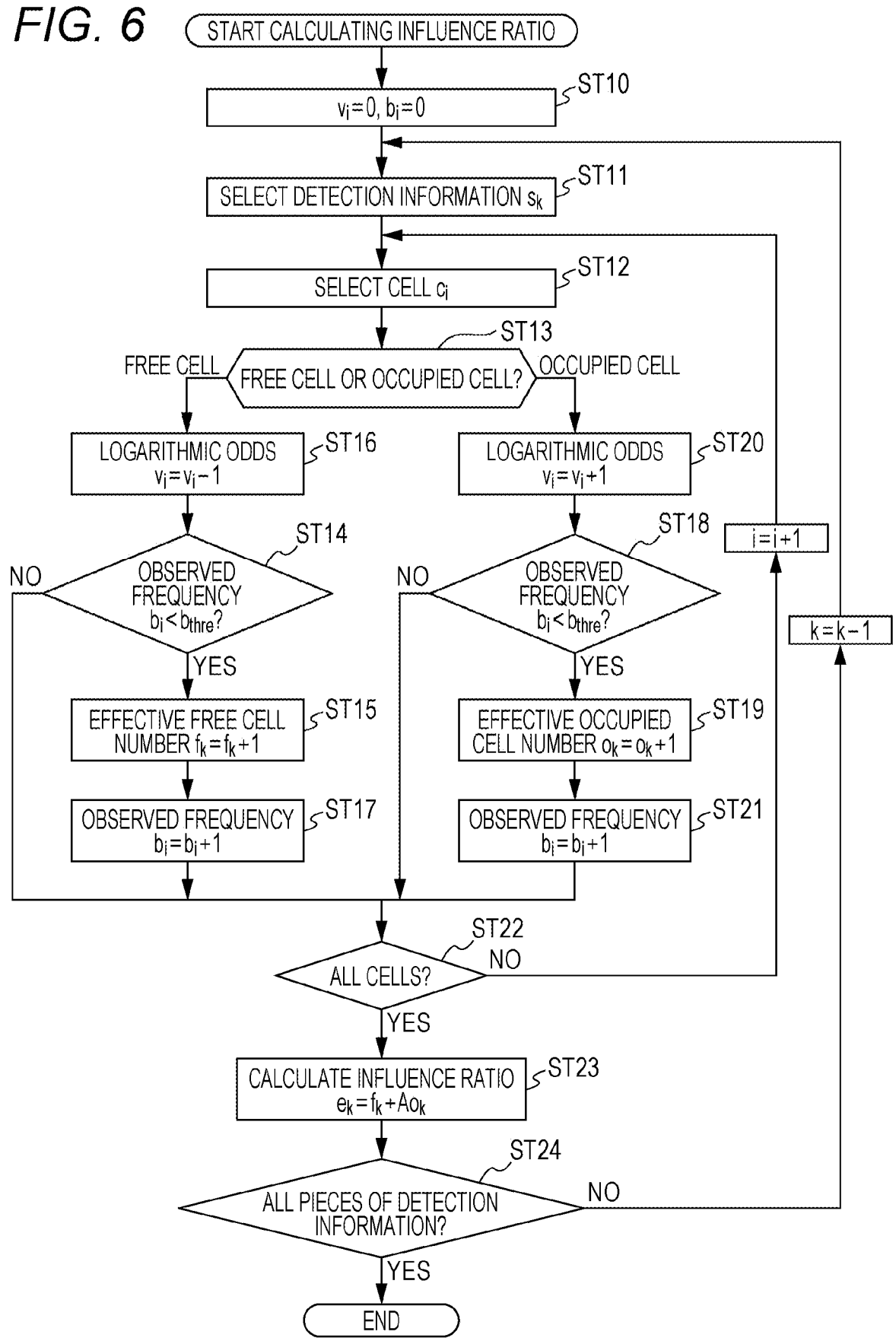
FIG. 6 illustrates a flowchart of the method, which is different from that of FIG. 5, for producing the occupancy grid map.

Next, operation of the mobile object and the method for producing (updating) the occupancy grid map M will be described in detail with reference to FIGS. 4 to 6. FIG. 4 illustrates a flowchart of operation of the mobile object. FIG. 5 illustrates a flowchart of the method for producing the occupancy grid map M, and FIG. 6 illustrates a flowchart of the method, which is different from that of FIG. 5, for producing the occupancy grid map M. Note that description of operation relating to running of the mobile object will be omitted herein, and description will be made focusing on the method for producing and updating the occupancy grid map M in association with running.

When the mobile object body 1 starts running by the running controller 21 of the control device 2, the ambient sensor is drivably controlled by the detection controller 22 to start detecting the peripheral object (a detection information acquisition step: a step ST1). The control device 2 estimates the self-location by the SLAM technique while storing, as the detection information, the detection value obtained by the ambient sensor in association with the self-location in the storage 27 (a detection information storage step: a step ST2). In detection of the detection information, the detection value obtained for the single cycle by the ambient sensor is taken as the single scan, and such a scan is stored as a single piece of detection information in the storage 27. Next, the control device 2 causes the map producer 23 to produce the occupancy grid map M based on the detection information stored in the storage 27 (a map production step: a step ST3), and causes the storage 27 to store the produced occupancy grid map M. Next, the control device 2 determines whether or not the detection information is to be reduced (a reduction determination step: a step ST4). At this step, it is determined whether or not the number of times of detection (the number of times of scan) reaches a predetermined number of times. When the number of times of detection has reached the predetermined number of times (YES at the step ST4), the processing proceeds to a next step ST5. When the number of times of detection does not reach the predetermined number of times (NO at the step ST3), the processing returns to the detection information acquisition step (the step ST1) again to acquire new detection information.

At the reduction determination step (the step ST4), in a case where it is determined that the detection information is to be reduced, the influence ratio calculator 24 of the control device 2 calculates, for each piece of detection information stored in the storage 27, the influence ratio for the occupancy grid map M (an influence ratio calculation step:a step ST5). Next, the map producer 23 of the control device 2 sorts the detection information based on the influence ratio calculated by the influence ratio calculator 24 to cut the detection information from the storage 27 (a detection information reduction step: a step ST6). An arithmetic procedure at the influence ratio calculation step (the step ST5) and the detection information reduction step (the step ST6) will be described later. Next, the map producer 23 of the control device 2 produces (updates) the occupancy grid map M again based on the reduced detection information (a map reproduction step: a step ST7), and causes the storage 27 to store the updated occupancy grid map M.

After the occupancy grid map M has been produced and updated as described above, the control device 2 determines, at a step ST8, whether or not running of the mobile object body 1 is to be continued. In a case where running is to be continued at the step ST8, the processing returns to the detection information acquisition step (the step ST1) again, the running controller 21 controls running of the mobile object body 1 based on the newly-produced occupancy grid map M, the detection controller 22 continues detection of the peripheral object by the ambient sensor, and the control device 2 repeats each step described above. In a case where running is not to be continued at the step ST8, the control device 2 stops running of the mobile object body 1, and stops operation of each component.

Next, the influence ratio calculated at the influence ratio calculation step (the step ST5) is calculated for each scan (detection information) for the occupancy grid map M by the influence ratio calculator 24, and as described above, the observed frequency calculated by the observed frequency calculator 25 is used. It is assumed that in a certain scan $S_k$, an effective free cell number is $f_k$ and an effective occupied cell number is $o_k$. Effective as described herein means not older than an observed frequency threshold ban. This threshold $b_{thre}$ is, as described above, equivalent to the number N of latest scans to be left. Moreover, for an i-th cell, the logarithmic odds is $v_i$, and the observed frequency is $b_i$. The sensor center location in the scan $s_k$ is obtained by the SLAM technique.

The influence ratio $e_k$ of the scan is represented by Expression (1):

$$e_k = f_k + A o_k \qquad (1),$$

where A is a constant for weighting the effective occupied cell number $o_k$. Generally, in the occupancy grid map M, the number of occupied cells is less than the number of free cells, but the occupied cells are of high importance because these cells indicate an obstacle. For this reason, a system is provided such that A provides a weight on the occupied cell number and priority is given to a scan with effective occupied cells. Note that in the following arithmetic processing, the constant A is 1.

The influence ratio $e_k$ is calculated in the middle of the ray casting. The procedure of the ray casting including calculation of the influence ratio $e_k$ will be described with reference to a flowchart of FIG. 5.

First, at a step ST10, the logarithmic odds $v_i$ and the observed frequency $b_i$ are initialized for all cells ($v_i=0$, $b_i=0$). Next, at a step ST11, the scan $s_k$ is selected in reverse chronological order. That is, selection is, in descending order, made starting from anew scan $s_k$ with a greater k value. Then, after a step ST12, the following processing is repeated for each cell $C_i$ in the scan $s_k$. That is, the line representing the laser beam is extended from the sensor center when the scan $s_k$ is obtained by a measurement distance (until reaching the object), and the following processing is repeated for each cell $C_i$ on the line. At a step ST13, steps ST14 to ST17 are executed in the case of a free cell $C_i$ (a free space) through which the line has passed, and steps ST18 to ST21 are executed in the case of an occupied cell $C_i$(the object) that the line has reached. Note that in a case where no reflection of the laser beam has been observed, no arithmetic processing is performed for a cell through which such a laser beam has passed, i.e., an unobserved cell.

In the case of the free cell $C_i$, when the observed frequency $b_i$ is less than the threshold $b_{thre}$ at the step ST14 (YES at the step ST14), 1 is added to the effective free cell number $f_k$ at the step ST15 ($f_k=f_k+1$), 1 is subtracted from the logarithmic odds $v_i$ at the step ST16 ($v_i=v_i-1$), and 1 is added to the observed frequency $b_i$ at the step ST17 ($b_i=b_i+1$). When the observed frequency $b_i$ is greater than the threshold $b_{thre}$ at the step ST14 (NO at the step ST14), the processing proceeds to a step ST22.

In the case of the occupied cell $C_i$, when the observed frequency $b_i$ is less than the threshold $b_{thre}$ at the step ST18 (YES at the step ST18), 1 is added to the effective occupied cell number $o_k$ at the step ST19 ($o_k=o_k+1$), 1 is added to the logarithmic odds $v_i$ at the step ST20 ($v_i=v_i+1$), and 1 is added to the observed frequency $b_i$ at the step ST21 ($b_i=b_i+1$). When the observed frequency $b_i$ is greater than the threshold $b_{thre}$ at the step ST18 (NO at the step ST18), the processing proceeds to the next step ST22.

At the step ST22, it is determined whether or not the processing for all cells $C_i$ included in the certain scan $s_k$ has ended, and when the processing does not end yet (NO at the step ST22), the processing returns to the step ST12 to execute similar processing for a subsequent cell $C_i$ (i=i+1). On the other hand, when the processing has ended for all cells $C_i$ included in the certain scan $s_k$ (YES at the step ST22), the processing proceeds to a next step ST23 to calculate the influence ratio $e_k$ of the scan $s_k$. At the step ST23, the influence ratio $e_k$ of the scan $s_k$ is calculated according to Expression (1) above. Next, at a step ST24, it is determined whether or not the processing for all scans $s_k$ has ended, and when the processing does not end yet (NO at the step ST24), the processing returns to the step ST11 to execute similar processing for the previous old scan $s_k$ (k=k-1). On the other hand, when the processing has ended for all scans $s_k$ (YES at the step ST24), the influence ratio calculation step (the step ST5) ends.

The above-described processing means as follows. Determination on whether or not the cell value is updated by the beam in the scan $s_k$ is made according to the observed frequency $b_i$, and the processing is performed starting from the new scan $s_k$. Thus, when the observed frequency $b_i$ of the cell $C_i$ exceeds the threshold $b_{thre}$, the previous scan $s_n$ ($1 \leq n \leq k-1$) provides no influence on the cell value. Such a scan $s_n$ is old observation for the cell value, and the cell value is not added to the influence ratio of the scan $s_n$. The scan $s_k$ mostly determined as old observation has a low influence ratio, and upon updating of the occupancy grid map M, is determined as unnecessary and is deleted (the later-described detection information reduction step: the step ST6).

As advantages of the above-described processing, the influence ratio can be calculated in the course of the ray casting, and therefore, a calculation cost can be decreased and even the old scan $s_k$ for a region with less observation can be left. That is, only the old scan $s_k$ is left in a region with no new observation, but as long as the observed frequency $b_i$ does not exceed the threshold $b_R$, such a scan $s_k$ has a high influence ratio and is not deleted. Thus, a finally-observed state can be held, and the occupancy grid map M can be stabilized.

Note that the influence ratio calculation step (the step ST5) is not limited to that in the above-described processing procedure, and may be executed in a procedure illustrated in FIG. 6. The processing procedure illustrated in FIG. 6 is different from that of FIG. 5 in the steps ST14 to ST17 and the steps ST18 to ST21. Specifically, the step ST16 is executed in advance of the step ST14, and the step ST20 is executed in advance of the step ST19. That is, regardless of comparison between the observed frequency $b_i$ and the threshold $b_{thre}$, 1 is subtracted from the logarithmic odds $v_i$ ($v_i = v_i - 1$) at the step ST16 in the case of the free cell $C_i$, and 1 is added to the logarithmic odds $v_i$ ($v_i = v_i + 1$) at the step ST20 in the case of the occupied cell $C_i$. By such a processing procedure, the old scan $s_k$ exceeding $b_{thre}$ is also used for updating of the cell value. Thus, updating of the cell value in response to the environmental change is delayed, whereas the stability of the cell value is enhanced.

After the influence ratio $e_k$ has been calculated for each scan (detection information) by the above-described influence ratio calculation step (the step ST5), the coverage calculator 27 calculates a coverage and sorts the detection information based on the coverage to cut the detection information from the storage 27 at the detection information reduction step (the step ST6), as illustrated in FIG. 4.

In the method for sorting the scan based on the calculated influence ratio $e_k$, a scan satisfying $e_k \leq e_{thre}$ is deleted using an influence ratio threshold $e_{thre}$. In this method, $e_{thre}$ is changed according to environment, and therefore, for setting $e_{thre}$, a coverage of a scan group S is used. The coverage of the scan group S is, as in Expression (2) below, the rate of the total of the influence ratios $e_k$ of the scan group S to the total of the influence ratios of all scan groups $S_0$ left at the current moment.

[Expression 1]

$$C(S) = \frac{\sum_{s \in S} e(s)}{\sum_{s \in S_0} e(s)} \quad (2)$$

As the coverage increases, the occupancy grid map M obtained by the scan group S becomes closer to the occupancy grid map obtained by all scan groups $S_0$. As described above, the coverage can represent the degree of completion of the occupancy grid map M, and is assumed as an easily-intuitively-specifiable index. For holding a high coverage during scan reduction, a scan with a high influence ratio $e_k$ may be preferentially included in the scan group S. Thus, a procedure for determining the threshold $e_{thre}$ for scan sorting by means of the coverage is as follows.

First, after the total totalE of the influence ratios of all scans has been obtained, all scans are sorted in the order of the influence ratio $e_k$. Next, for each scan $s_k$, calculation according to Expressions (3) and (4) below is repeated in descending order of the influence ratio $e_k$, and the influence ratio $e_k$ when Expression (4) is no longer satisfied (satisfying sum/totalE≥coverage) is taken as the threshold $e_{thre}$. In this expression, coverage is a coverage specified by the user, and, e.g., 0.95 (95%) is used.

sum=sum+$e_k$ (3)

sum/totalE<coverage (4)

At the map reproduction step (the step ST7), the map producer 23 stores, for each scan $s_k$ sorted and left by each of the above-described procedures, the logarithmic odds $v_i$ and the observed frequency $b_i$ as the cell value obtained by the arithmetic processing in the storage 27, and the occupancy grid map M is updated accordingly.

Figure 8:
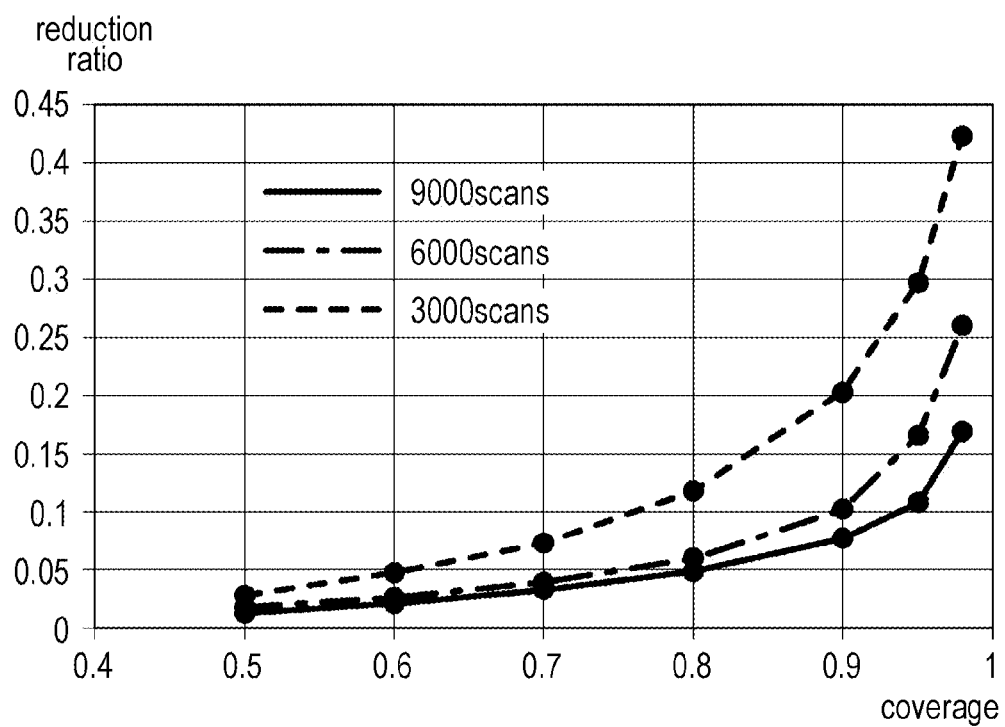
FIG. 8 illustrates a graph of a reduction ratio of a scan number in the production example.
Figure 10:
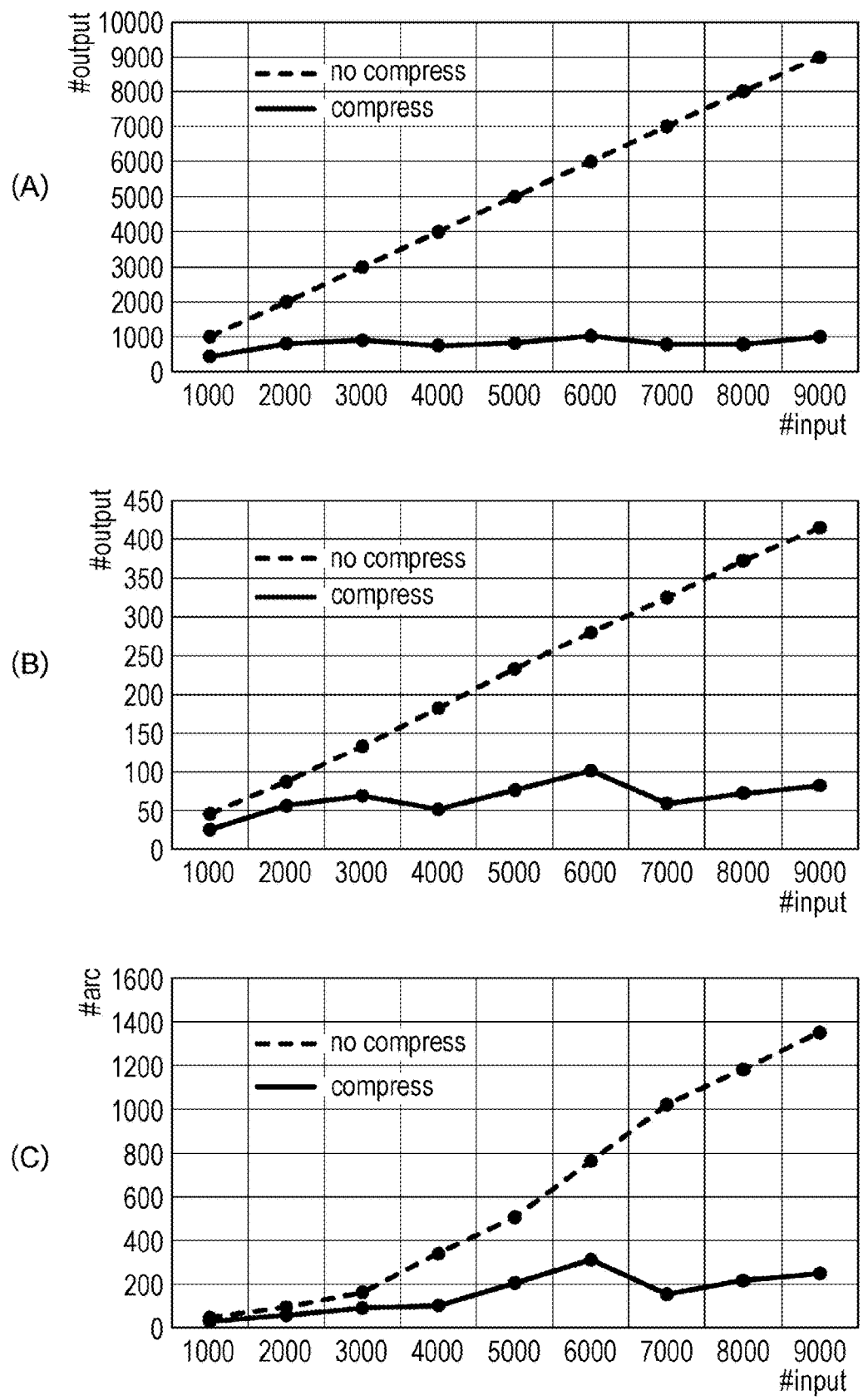
FIGS. 10(A) to 10(C) illustrate graphs of a relationship among an input scan number and a scan number, a node number, and an arc number after reduction in the production example.

Hereinafter, an example where the occupancy grid map M has been produced will be described with reference to FIGS. 7 to 10. FIG. 7 illustrates diagrams of the occupancy grid map production example. FIG. 8 illustrates a graph of a reduction ratio of the scan number in the production example, and illustrates the reduction ratio of the scan number by setting of the coverage. FIG. 9 illustrates diagrams of the quality of the occupancy grid map in the production example. FIGS. 10(A) to 10(C) illustrate graphs of a relationship among an input scan number and a scan number, a node number, and an arc number after reduction in the production example.

FIG. 7(A) illustrates the occupancy grid map M produced without scan reduction as a typical example, and FIG. 7(B) illustrates the occupancy grid map M produced after scan reduction by the above-described production method of the present invention. In the production method of the present invention, 0.95 is applied as the coverage. FIG. 7 illustrates, on the occupancy grid map M, the movement trajectory of the mobile object corresponding to the scan used for map generation. As illustrated in FIG. 7(A), the mobile object has run in the order of A, B, . . . , F. In FIG. 7(B), the scan is reduced, and therefore, the location of the mobile object is illustrated fragmentally. Note that in this example, a simple short route is taken for the sake of visibility and the reduction ratio is not so high.

As illustrated in FIG. 7(B), it is shown that the old scans are deleted by the production method of the present invention. For example, a first half portion of a section A-B is deleted. A scan group acquired at such a portion mainly determines the occupancy probability for cells at an upper portion of a room. This is because cell values are replaced with those of a second half portion of a section E-F where the mobile object has run later and the influence ratio of the section A-B is decreased. Moreover, a section C-D is also deleted. This is because such a section is replaced with a remaining portion of a section D-E. Note that in FIG. 7(B), a region with an unknown cell value is present on an upper right side of the section C-D, but this is a missing portion caused due to a coverage of 0.95.

FIG. 7(A) illustrates occupied cells (black) of walls with no missing portion, but FIG. 7(B) illustrates some missing portions. It is assumed that this is because due to scan distortion and error, the cell value becomes unstable only with a small number of latest scans. This is solved by use of many scans in cell value calculation. That is, the observed frequency $b_i$ may be used only for scan selection, and as illustrated in FIG. 6, calculation of the logarithmic odds $v_i$ may be performed regardless of the observed frequency $b_i$. Note that according to the processing procedure illustrated in FIG. 6, the environmental change cannot be promptly reflected. As described above, the stability of the cell value and the response to the environmental change have conflicting aspects. Such a characteristic is assumed as an essential characteristic of the occupancy grid map M, and the processing procedures may be differently used as necessary according to a space or environment as a target.

FIGS. 8 and 9 illustrate the way to change the reduction ratio of the scan number and the quality of the occupancy grid map M by setting of the coverage. The graph of FIG. 8 illustrates the reduction ratio in association with the coverage in a case where the scan number is 3000, 6000, and 9000. FIGS. 9(A) and 9(B) illustrate the occupancy grid maps M produced in cases where the coverage is 0.6 and 0.9. The reduction ratio as described herein is defined as a value obtained by division of the scan number after reduction by the scan number before reduction. According to such a definition, the reduction ratio decreases as the scans after reduction decreases.

As illustrated in FIG. 8, the reduction ratio increases as the coverage increases. Moreover, the reduction ratio decreases as the scan number increases. This is because an overlapped measurement area increases as the scan number increases. With the same scan number for the area of the target space, a measurement multiplicity increases as the area decreases. That is, measurement is performed for the same location many times, and the scan reduction ratio decreases.

As illustrated in FIG. 9, the quality of the generated occupancy grid map M changes according to the coverage. This figure illustrates an example where the occupancy grid map M is compared between a coverage of 0.6 and a coverage of 0.9. There are missing portions N (in the figure, portions indicated as gray) in the case of a coverage of 0.6 as illustrated in FIG. 9(A), but almost all missing portions are filled in the case of a coverage of 0.9 as illustrated in FIG. 9(B). Note that depending on the area and length of the target space, a missing region is confirmed in some cases even when the coverage is 0.9. It is assumed that causes for such a region are less scan overlapping and many scans with a high influence ratio and a lack of the maximum laser scanner measurement distance on, e.g., along hallway. Measurement cannot be performed in a longitudinal direction of the long hallway, and for this reason, an unobserved region is present. For scans of an intermediate portion of the hallway, the effective cell number decreases, and the influence ratio decreases. Due to combination of these causes, it is assumed that the missing portions are left. For these reasons, the missing portions are eliminated by an increase in the coverage, but the reduction ratio decreases. Thus, it is effective to set the coverage as necessary according to the target space and the environment.

FIG. 10(A) illustrates a relationship between the input scan number and the scan number after reduction in the production example, FIG. 10(B) illustrates a relationship between the input scan number and the node number after reduction, and FIG. 10(C) illustrates a relationship between the input scan number and the arc number after reduction. Note that FIGS. 10(B) and 10(C) illustrate that the node number and the arc number are reduced as a result of contraction of the pose graph used for the loop closure as described above. In the SLAM technique, the mobile object location is obtained in each scan, and therefore, the node and the scan are in one-to-one correspondence. Note that in a case where the pose adjustment is performed using a key frame, the mobile object location is extracted in units of key frame, and is taken as a node. In this case, the node is generated in units of key frame. The key frame described herein is a scan decimated at a certain interval, and the mobile object location is extracted every time a translation distance and a rotation angle exceed thresholds (e.g., 0.4 m and 60°). If there is even one scan of which influence ratio $e_k$ exceeds the threshold $e_{thre}$ among a scan group between key frames corresponding to nodes, these nodes are employed, and non-employed nodes are deleted.

As illustrated in FIG. 10(A), it is shown that even when the input scan number increases, the scan number after reduction does not increase much and is constant or slightly increases. This is because not only the scan number but also overlapping portions increase as the mobile object runs. A dashed line in FIG. 10(B) indicates the node number in a case where only pose graph key frame decimation is performed, but only by key frame decimation, the node number increases in proportion to the scan number. On the other hand, as indicated by a solid line, the processing of the present invention further reduces the node number, and suppresses an increment with respect to the scan number. A dashed line in FIG. 10(C) indicates the arc number in a case where only key frame decimation is performed, and the arc also shows a tendency similar to that of the node. The arc is also influenced by the number of loops, and therefore, increase/decrease behavior is more complicated than that of the node.

According to the present embodiment, the following features and advantageous effects can be provided.

(1) The mobile object includes the running device 3, the detection device 4, and the control device 2, and causes the map producer 23 of the control device 2 to generate and update the occupancy grid map M. Thus, the map accuracy of the occupancy grid map M can be ensured while a memory capacity and an arithmetic processing load can be reduced.

(2) The map producer 23 of the control device 2 sorts the scan $s_k$ (the detection information) to produce the occupancy grid map M based on the influence ratio $e_k$ calculated by the influence ratio calculator 24. Thus, the occupancy grid map M can be efficiently produced or updated. That is, the map producer 23 performs such sorting that the scan $s_k$ with a low influence ratio $e_k$ for the occupancy grid map M is not used. Thus, the number of scans to be utilized for the arithmetic processing can be reduced, the memory capacity can be suppressed low, and the arithmetic processing load can be reduced. Meanwhile, the scan $s_k$ with a high influence ratio for the occupancy grid map M is sorted and used, and therefore, an effective scan is left even though such a scan is the old scan $s_k$. Consequently, the map accuracy of the produced occupancy grid map M can be ensured.

(3) The observed frequency calculator 25 counts the scan $s_k$ stored in the storage 27 for each cell $C_i$ of the occupancy grid map M to calculate the observed frequency $b_i$, and based on the observed frequency $b_i$, increases the influence ratio $e_k$ of the scan $s_k$ according to the percentage of the effective cell $C_i$. Thus, the scan $s_k$ can be efficiently sorted. That is, in a case where multiple scans $s_k$ including old scans and new scans are present for a certain cell $C_i$, the number of these scans is recorded as the observed frequency $b_i$, and a predetermined number of scans are taken as effective in reverse chronological order and scans older than these scans are taken as ineffective. Moreover, the influence ratio $e_k$ of the scan $s_k$ with many effective cells $C_i$ is evaluated high. With this configuration, the influence ratio $e_k$ of the new scan $s_k$ easily reflecting the environmental change becomes higher for the cell $C_i$ with a higher observed frequency $b_i$, and the map accuracy of the occupancy grid map M can be enhanced. For the cell $C_i$ with a lower observed frequency $b_i$ even the influence ratio $e_k$ of the relatively-old scan $s_k$ is evaluated high, and the occupancy grid map M can be produced with even the old scan $s_k$ with effective information being properly left.

(4) The map producer 23 deletes the scan $s_k$ of which influence ratio $e_k$ is less than the predetermined threshold $e_{thre}$ from the storage 27, and the occupancy grid map M is produced based on the deleted scan $s_k$. Thus, the arithmetic processing load and time necessary for production of the occupancy grid map M can be reduced, and the capacity of the storage 27 can be saved. Further, the occupancy grid map M is produced using the scan $s_k$ with a high influence ratio $e_k$, and therefore, can be efficiently produced.

(5) The map producer 23 sets the threshold $e_{thre}$ of the influence ratio $e_k$ based on the coverage calculated by the coverage calculator 26, and therefore, the scan $s_k$ can be efficiently sorted for production of the occupancy grid map M. Moreover, the threshold $e_{thre}$ of the influence ratio $e_k$ is automatically set based on the coverage so that the efficiency of the arithmetic processing can be enhanced.

(6) By the processing procedure as illustrated in FIG. 6, the old scan $s_k$ exceeding $b_{thre}$ is also used for updating of the cell value to update the logarithmic odds $v_i$. Thus, updating of the cell value in response to the environmental change is delayed, whereas the stability of the cell value is enhanced. Consequently, the stability of the occupancy grid map M can be improved.

Variations of Embodiments

Note that the present invention is not limited to the above-described embodiment, and variations, modifications and the like made within such a scope that the object of the present invention can be accomplished are included in the present invention.

For example, in the above-described embodiment, no specific example has been described as the mobile object. The mobile object may include a moving robot such as a service robot or a home robot. Specifically, examples of the mobile object may include a cleaning robot, a security robot, a transportation robot, and a guide robot. Further, the mobile object may be a self-driving automobile or a maintenance vehicle. In addition, the movement range of the mobile object is not limited to the two-dimensional planar space, and may be a three-dimensional space. In this case, the mobile object may be a flying object such as a drone. That is, in the above-described embodiment, the example using 2D-SLAM has been described as the SLAM technique. However, a map generation system of the present invention is also applicable to 3D-SLAM targeted for the three-dimensional space.

In the above-described embodiment, the mobile object body 1 of the mobile object includes the control device 2, and the control device 2 is provided with the map producer 23 and the storage 27. However, it may be configured such that the map production device configured to produce the occupancy grid map M, the storage device configured to store the occupancy grid map M and the like are provided not at the mobile object body 1 but at other types of equipment communicable with the mobile object body and the mobile object body 1 autonomously runs based on the occupancy grid map M produced by the other types of equipment. Alternatively, the mobile object does not necessarily include the movement device (the running device), and it may be configured such that the periphery of, e.g., a wagon on which the detection device is placed is detected while the user is manually moving the wagon.

Figure 11:
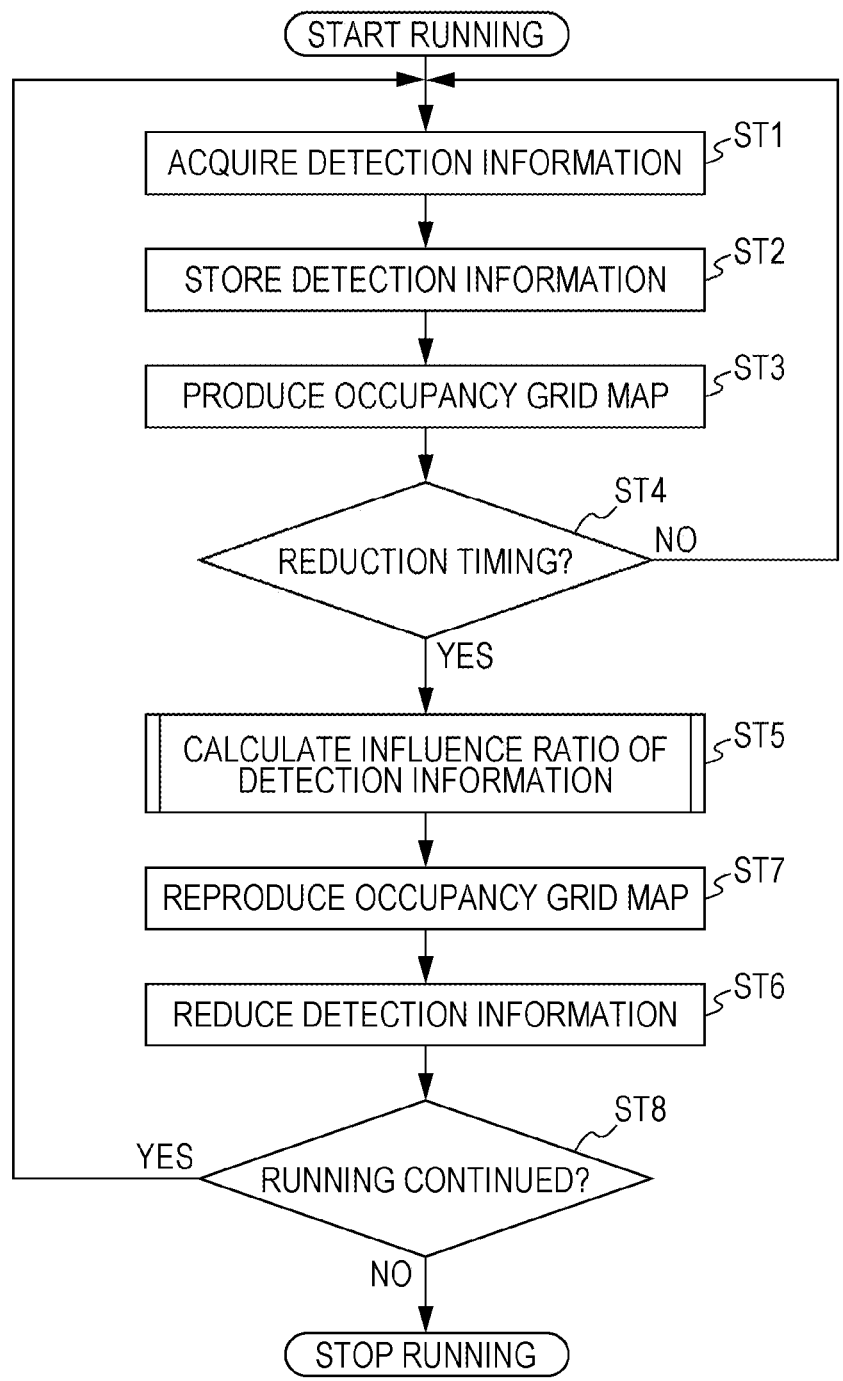
FIG. 11 illustrates a flowchart of a variation of operation of the mobile object.

As illustrated in FIG. 4, in the method for producing the occupancy grid map M in the above-described embodiment, the detection information is sorted and is cut from the storage 27 at the detection information reduction step (the step ST6). Thereafter, the occupancy grid map M is updated based on the cut detection information at the map reproduction step (the step ST7). However, the present invention is not limited to such a processing procedure, and a processing procedure as illustrated in FIG. 11 may be employed. FIG. 11 illustrates a flowchart of a variation of operation of the mobile object. In the procedure illustrated in FIG. 11, the map reproduction step (the step ST7) is executed in advance of the detection information reduction step (the step ST6), and the occupancy grid map M is updated based on the detection information before the detection information is cut. Thereafter, the sorted detection information is cut from the storage 27. According to this procedure, the map producer 23 produces, before the detection information is cut from the storage 27, the occupancy grid map M by means of all pieces of detection information stored in the storage 27. Thus, the stability of the occupancy grid map M can be improved.

INDUSTRIAL APPLICABILITY

As described above, the present invention is suitably utilized for the map generation system configured to reduce, in various mobile objects, such as a robot, autonomously moving by means of an occupancy grid map, a memory capacity necessary for, e.g., production of the occupancy grid map and an arithmetic processing load to enhance efficiency in production of the occupancy grid map.

LIST OF REFERENCE SIGNS

1 Mobile object body
2 Control device
3 Running device (movement device)
4 Detection device
23 Map producer (map production device)
24 Influence ratio calculator (influence ratio calculation device)
25 Observed frequency calculator (observed frequency calculation device)
26 Coverage calculator (coverage calculation device)
27 Storage (storage device)
C Cell (section)
M Occupancy grid map
S Scan (detection information)

What is claimed is:
1. A map generation system comprising:
a detection device configured to:
obtain a detection value for each of laser beams, the detection value indicating a distance to and a direction of objects at a periphery of a mobile object, the laser beams being emitted from a laser sensor that is mounted on the mobile object, and
generate pieces of detection information, each of the pieces of the detection information including the detection values collected at every predetermined cycle,
a map production device configured to produce an occupancy grid map based on the pieces of the detection information obtained by the detection device, the occupancy grid map being divided into multiple sections and representing a shape of the periphery of the mobile object,
a storage device configured to store the pieces of the detection information obtained by the detection device and store the occupancy grid map produced by the map production device; and
an influence ratio calculation device configured to calculate an influence ratio for each of the pieces of the detection information stored in the storage device, the influence ratio indicating a degree to which a corresponding piece of the detection information influences the occupancy grid map, wherein the map production device remakes the occupancy grid map at a given timing based on the pieces of the detection information stored in the storage device, when the map production device remakes the occupancy grid map, the influence ratio calculation device:

determines, per one of the sections of the occupancy grid map, a predetermined number of pieces of the detection information as being pieces of the detection information that contribute determination of a section value of the one of the sections, the predetermined number of pieces of the detection information being selected from one or more pieces of the detection information in a reverse chronological order, each of the one or more pieces of the detection information being associated with at least one of the laser beams that passes through or is reflected from the one of the sections; and calculates, as the influence ratio for each of the pieces of the detection information, a weighted sum of a number of effective sections, each of the effective sections being a section in which the each of the pieces of the detection information contributes to the determination of the section value of the section, and when the map production device remakes the occupancy grid map, the map production device reduces the pieces of the detection information stored in the storage device by deleting at least one of pieces of the detection information of which the influence ratio calculated by the influence ratio calculation device is less than a predetermined influence ratio threshold.

2. The map generation system according to claim 1, further comprising:

an observed frequency calculation device configured to count, per one of the sections of the occupancy grid map, observed frequency representing the number of pieces of the detection information relevant to the one of the sections of the occupancy grid map, wherein when the map production device remakes the occupancy grid map based on the pieces of the detection information stored in the storage device, the observed frequency calculation device:

selects one of the pieces of the detection information stored in the storage device in the reverse chronological order, the one of the pieces of the detection information including free sections and occupied sections, the free sections being sections through which at least one of the laser beams passes, the occupied sections being sections from which at least one of the laser beams is reflected;

increases, per one of the free sections, the observed frequency of the one of the free sections by one when the observed frequency of the one of the free sections is less than a predetermined observed frequency threshold, and increases, per one of the occupied sections, the observed frequency of the one of the occupied sections by one when the observed frequency of the one of the occupied sections is less than the predetermined observed frequency threshold; and increases, per one of the free sections, an effective free section number when the observed frequency of the one of the free sections is less than the predetermined observed frequency threshold, and increases, per one of the occupied sections, an effective occupied section number when the observed frequency of the one of the occupied sections is less than the predetermined observed frequency threshold, the effective free section number indicating a number of the free sections that has the observed frequency less than the predetermined observed frequency threshold, the effective occupied section number indicating a number of the occupied sections that has the observed frequency less than the predetermined observed frequency; and the influence ratio calculation device calculates, as the influence ratio for each of the pieces of the detection information, a weighted sum of the effective free section number and the effective occupied section number in the each of the pieces of the detection information.

3. The map generation system according to claim 2, wherein the map production device:

decreases logarithmic odds of one of the sections by one when the one of the sections is one of the free sections and has the observed frequency calculated by the observed frequency calculation device less than the predetermined threshold, and increase logarithmic odds of one of the sections by one when the one of the sections is one of the occupied sections and has the observed frequency calculated by the observed frequency calculation device less than the predetermined threshold.

4. The map generation system according to claim 2, wherein the map production device:

decreases, regardless of the observed frequency calculated by the observed frequency calculation device, logarithmic odds of one of the sections by one when the one of the sections is one of the free sections, and increase, regardless of the observed frequency calculated by the observed frequency calculation device, logarithmic odds of one of the sections by one when the one of the sections is one of the occupied sections.

5. The map generation system according to claim 1, further comprising:

a coverage ratio calculation device configured to calculate, a coverage ratio between a total of influence ratios of all the pieces of the detection information stored in the storage device and a total of influence ratios of pieces of the detection information belonging to a group of a predetermined number of pieces of detection information, wherein the map production device sets the influence ratio threshold such that the coverage ratio calculated by the coverage ratio calculation device is a predetermined value or more.

6. A mobile object comprising:

a movement device;

a detection device; and a control device, wherein the detection device configured to:

obtain a detection value for each of laser beams, the detection value indicating a distance to and a direction of objects at a periphery of a mobile object, the laser beams being emitted from a laser sensor that is mounted on the mobile object, and generate pieces of detection information, each of the pieces of the detection information including the detection values collected at every predetermined cycle, the control device includes:

a map production device configured to produce an occupancy grid map based on the pieces of the detection information obtained by the detection device, the occupancy grid map being divided into multiple sections and representing a shape of the periphery of the mobile object, a storage device configured to store the pieces of the detection information obtained by the detection device and store the occupancy grid map produced by the map production device; and an influence ratio calculation device configured to calculate an influence ratio for each of the pieces of the detection information stored in the storage device, the influence ratio indicating a degree to which a corresponding piece of the detection information influences the occupancy grid map, wherein the map production device remakes the occupancy grid map at a given timing based on the pieces of the detection information stored in the storage device, when the map production device remakes the occupancy grid map, the influence ratio calculation device:

determines, per one of the sections of the occupancy grid map, a predetermined number of pieces of the detection information as being pieces of the detection information that contribute determination of a section value of the one of the sections, the predetermined number of pieces of the detection information being selected from one or more pieces of the detection information in a reverse chronological order, each of the one or more pieces of the detection information being associated with at least one of the laser beams that passes through or is reflected from the one of the sections; and calculates, as the influence ratio for each of the pieces of the detection information, a weighted sum of a number of effective sections, each of the effective sections being a section in which the each of the pieces of the detection information contributes to the determination of the section value of the section, and when the map production device remakes the occupancy grid map, the map production device reduces the pieces of the detection information stored in the storage device by deleting at least one of pieces of the detection information of which the influence ratio calculated by the influence ratio calculation device is less than a predetermined influence ratio threshold.

\* \* \* \* \*